United States Patent [19]

Meurer et al.

[11] Patent Number: 5,135,988
[45] Date of Patent: Aug. 4, 1992

[54] PROCESS FOR THE PREPARATION OF ETHYLENE/VINYL ACETATE COPOLYMERS WITH REDUCED TENDENCY TO TACKINESS, NEW ETHYLENE/VINYL ACETATE COPOLYMERS AND THEIR USE

[75] Inventors: Kurt P. Meurer, Koenigswinter; Gerd Sylvester; Christian Ohm, both of Leverkusen; Hugo Zimmermann, Cologne; Herbert Bartl, Odenthal, all of Fed. Rep. of Germany

[73] Assignee: Bayer Aktiengesellschaft, Leverkusen, Fed. Rep. of Germany

[21] Appl. No.: 380,393

[22] Filed: Jul. 17, 1989

[30] Foreign Application Priority Data

Jul. 27, 1988 [DE] Fed. Rep. of Germany ....... 3825450

[51] Int. Cl.$^5$ ................... C08F 255/02; C08F 263/04

[52] U.S. Cl. ..................................... 525/302; 525/53; 525/260; 525/263; 525/324

[58] Field of Search ........................ 525/302, 263, 260

[56] References Cited

U.S. PATENT DOCUMENTS 2,542,771  2/1951  Hanford et al. ..................... 525/190
3,796,696  3/1974  Brown ................................. 526/331

FOREIGN PATENT DOCUMENTS 4943391  11/1974  Japan ................................... 525/302

Primary Examiner—James J. Seidleck
Assistant Examiner—Vasu S. Jagannathan
Attorney, Agent, or Firm—Connolly & Hutz

[57] ABSTRACT

Ethylene/vinyl acetate copolymers containing very high molecular weight components and having a reduced tendency to tackiness may be obtained by a further addition of ethylene during the process of solution polymerization at a moderate pressure.

9 Claims, No Drawings

PROCESS FOR THE PREPARATION OF ETHYLENE/VINYL ACETATE COPOLYMERS WITH REDUCED TENDENCY TO TACKINESS, NEW ETHYLENE/VINYL ACETATE COPOLYMERS AND THEIR USE

This invention relates to a process for the preparation of ethylene/vinyl acetate (EVA) copolymers by the solution process in which the invention succeeds in reducing the tendency of the end products to tackiness, thereby improving the free flowing quality of the granulate, by a further addition of ethylene during polymerisation. The invention also relates to ethylene/vinyl acetate copolymers containing a copolymer component of very high molecular weight.

It is well known that ethylene and vinyl acetate may be radically copolymerised in any desired proportions. When the vinyl acetate content (hereinafter referred to as "VA content") is low, the copolymers have the usual crystallinity of polyethylene at room temperature. Ethylene/vinyl acetate copolymers with a copolymerised vinyl acetate content of up to about 30% have a thermoplastic character on account of their relatively long ethylene sequences (see H. Bartl, J. Peter, "Über Ethylen/Vinylacetate-Copolymerisate und ihre Vernetzung", Kautschuk and Gummi 14, WT 23–WT 32 (1961); Winnacker Küchler, Chem. Technologie, Volume 6, 4th Edition, Chapter 2.2.7, "Ethylen-Vinylacetate-Copolymere", published by Carl Hanser Verlag, Munich/Vienna, 1981, pages 570–572; M. Arne, R. H. Schwaar, Report No. 155, Ethylene Copolymers, Process Economics Program, Menlo Park, Calif., pages 1 to 40 (1983)). Ethylene/vinyl acetate copolymers (see H. Bucka, R. Nitzsche, H. Onderka, Plaste und Kautschuk 30, (6), 302–305 (1983)) with a low vinyl acetate content may be prepared economically by high pressure polymerisation. Copolymers with a low vinyl acetate content (up to 50% by weight of vinyl acetate) may be prepared particularly economically and with advantageous properties by the classical solvent free high pressure polymerisation process. The polymerisation is generally carried out at pressures of from 1000 to 2000 bar and at temperatures from 150° to 280° C.

The pressure and temperature may be lowered as the proportion of vinyl acetate incorporated increases. At high vinyl acetate contents, it becomes more difficult to prepare copolymers with a high molecular weight and high Mooney viscosity on account of the high temperature required for solvent free polymerisation. EVA copolymers having a VA content above 60% by weight and good elastomeric properties cannot be prepared by the high pressure process.

EVA copolymers having a vinyl acetate content of more than 30% by weight may also be prepared by a process of solution polymerisation at moderate pressures. The solvents used may be, for example, tert.-butanol or mixtures of tert.-butanol, methanol and hydrocarbons, in which the polymers remain in solution during the polymerisation process (see U.S. Pat. No. 2,396,785, DE-AS 1 126 614 and 1 126 613, FR-PS 1 189 387, U.S. Pat. No. 2,947,735, GB-PS 807 112 and 843 974, FR-PS 1 238 589 and 1 225 704 and DE-OS 3 323 531).

Rubber-like polymers containing about 40 to 75% by weight of copolymerised vinyl acetate are obtained according to DE-AS 1,495 767 by a process of solution polymerisation of ethylene and vinyl acetate in tert.-butanol.

The solution polymerisation process is generally carried out in a cascade of from 3 to 10 reactors, using tert.-butanol as solvent, temperatures from 50° to 130° C. and a pressure of from 50 to 700 bar in the presence of radical forming substances such as organic peroxide or azo compounds as polymerisation initiators.

EVA copolymers having a VA content of 40% by weight or more have a more or less marked tendency to tackiness which may cause an EVA copolymer granulate to cake together in storage, in particular under pressure (e.g. under its own pressure), especially if the VA content is from 50 to 75% by weight. The free flowing property of the granulate is thereby impaired. It was therefore an object of this invention to eliminate or at least substantially reduce this tendency to tackiness.

It has now surprisingly been found that this problem may be solved by the after-dosing of ethylene. It has already previously been proposed to after-dose starting monomers for the preparation of EVA copolymers.

Thus according to DE-AS 11 26 614, monomers used up by polymerisation in the preparation of EVA copolymers with VA contents of up to 35% by weight are replaced to such an extent that the E/VA ratio is kept within certain limits. The products obtained are said to be distinguished by their high strength combined with high elongation and good transparency.

According to DE-PS 33 23 531, vinyl acetate and/or radical starters are after-dosed in a continuous process for the preparation of EVA copolymers. The products obtained are said to have improved tensile strength.

None of the literature references mentioned deals with the problem of the tackiness of EVA copolymers and therefore could not be said to suggest the solution to the problem according to the invention.

This invention relates to a process for the preparation of ethylene/vinyl acetate copolymers having a copolymerised vinyl acetate content, based on the copolymer, of from 40 to 98% by weight, preferably from 50 to 85% by weight, by solution polymerisation of the monomers in the presence of radical forming initiators at temperatures from 40° to 120° C., preferably from 50° to 90° C., and at a pressure of from 50 to 700 bar, preferably from 100 to 400 bar, characterised in that a) vinyl acetate and ethylene are first subjected to polymerisation in a molar ratio of from 1:0.3 to 1:20, preferably from 1:1 to 1:2, and, after a conversion rate of from 10 to 70%, preferably from 20 to 60%, based on the vinyl acetate put into the process, has been reached, b) ethylene is added to the reaction mixture in a quantity of from 10 to 200% by weight, preferably from 50 to 150% by weight of the quantity of ethylene used in stage a), and polymerisation is then continued to a conversion rate of 25 to 90%, preferably 35 to 80%, based on the vinyl acetate put into the process, the stage b) polymerisation resulting in an increase in the conversion rate of at least 5%, preferably at least 10%, based on the vinyl acetate and compared with the conversion rate of stage a).

The process according to the invention may be carried out continuously or batch-wise. It is preferably carried out continuously in reaction containers (cascades) connected in series, preferably with at least 3, in particular 3 to 10 reactors.

The quantity of solvent used is generally from 10 to 300% by weight, preferably from 20 to 200% by weight, based on the vinyl acetate used.

Examples of suitable radical forming polymerisation initiators include organic peroxides and azo compounds, e.g. benzoyl peroxide, lauroyl peroxide, tert.-butyl perpivalate, tert.-amyl perpivalate, cyclohexyl peroxy dicarbonate, azo-bis-isobutyronitrile and azo-bis-isovaleric acid derivatives.

The polymerisation initiators are generally used in quantities of from 0·02 to 1·5% by weight, based on the quantity of copolymerisable monomers used.

According to a preferred embodiment, the quantity of polymerisation initiator is sub-divided, only one portion being added at the onset of the reaction while 10 to 50% by weight of the quantity of initiator originally added is added subsequently, preferably together with the after-dosed ethylene.

The copolymers prepared according to the invention have Mooney viscosities (according to DIN 53 523) of from 20 to 60 ML-4/100° C., preferably from 20 to 50 ML-4/100°) C.

The invention further relates to ethylene/vinyl acetate copolymers containing from 40 to 98% by weight of copolymerised vinyl acetate, based on the quantity of copolymer, and having a number average molecular weight $\overline{M}_n$ of from 20,000 to 40,000, characterised in that from 2 to 80% by weight, preferably from 2 to 30, in particular from 5 to 15% by weight of this copolymer (individual) have molecular weights of from $10^6$ to $10^9$, preferably $5 \times 10^6$ to $10^9$, in particular from $10^7$ to $10^9$, and are uncross-linked, the remainder of the copolymer having lower molecular weights.

The number average molecular weights $M_n$ are determined by membrane osmometry (methylene chloride as solvent).

The (individual) molecular weights are determined by gel permeation chromatography coupled with viscosimetry and turbidity titration, as follows:

The samples are prepared at a concentration of 10 g/l in $CH_2Cl_2$ and ultracentrifuged (for 1 hour at 20,000 min$^{-1}$) after 24 hours at room temperature. The sediment which separates is dried under vacuum at 60° C. and weighed ($\gamma_{UZ}$). In addition, the Staudinger Index ($[\eta]_{Sol}$) of the sol solution is determined in $CH_2Cl_2$ at 25° C., using an automated Ubbelohde capillary viscosimeter.

Gel chromatic separation is carried out on 8 Styragel ® columns arranged one behind the other (pore size $10^2/10^2/10^3/10^3/10^4/10^4/10^5/10^6$ nm; total length 976 cm). 2·0 ml of the sol solution diluted to c=2 g/l with $CH_2Cl_2$ are added after filtration through a membrane filter with a pore diameter of 1·2 μm and eluted with $CH_2Cl_2$ (flow velocity 0·5 ml/min). A refractometer is used as concentration proportional detector. An IR filter photometer is used at λ=5·76 nm (λ=1·736 nm) for specific detection of the acetate band.

Coupled with the gel chromatographic separation, 5 ml of the eluate, corresponding to 1 count in the gel chromatogram, are used for carrying out an automatic viscosity measurement in a modified Ubbelohde viscosimeter, followed by a turbidimetric titration. To carry out this titration, the eluate is transferred to a cuvette inside a blackened metal housing and the precipitating agent (methanol) is continuously added at the rate of 2 ml/min from a hose pump. A total of 15 ml of precipitating agent is added. A mechanical stirrer (8000 revs per min) is used for rapid mixing of the components.

The cuvette is illuminated with a light emission diode. The intensity of scattered light of the mixture of solution/precipitating agent is measured with an optical device at an angle of 20° C. to the primary beam and recorded in dependence upon the quantity of precipitating agent added.

75 such eluate fractions are obtained in the course of one gel chromatographic investigation, about 20 to 30 of which contain the separated sample. The calculation of molecular weight distribution from the refractometric and viscosimetric data is carried out on the basis of known constants and by means of a universal calibration curve by the method of Benoit (H. Benoit, P. Rempp, Z. Grubisic, J. Polymer Sci., Polymer Lett. Ed. 3, 77 (1965); polystyrene standards in the molecular weight range of from 600 to 10,000,000; calibration curve set up according to the following equation $$\log([\eta] \cdot M0 = f(V_E))$$

$[\eta]$ = Studinger Index determined in methylene chloride at 25° C. in a Ubbelohde capillary viscosimeter
M = molecular weight
$V_E$ = elution volume in 5 ml units).

The amount of copolymers prepared according to the invention may be determined as a percentage of the insoluble component by 25 hours extraction with toluene in a Soxhlet attachment. The term "uncross-linked" used above means that the gel content is below 0·5% by weight.

In their unvulcanized state, the EVA copolymers prepared according to the invention may be used as flow improvers for lubricants and hydraulic oils, as binders for adhesives, in particular for hot melt adhesives, and as plasticising mixing components for thermoplasts and duroplasts.

The vulcanized EVA copolymers prepared according to the invention may be used for the production of moulded articles, sheet products and coatings and coverings of all types, e.g. for the production of the outer sheaths of cables, cable lines, insulations, conveyor belts and flexible tubes.

The invention further relates to the use of the ethylene/vinyl vinyl acetate copolymers according to the invention for vulcanized or unvulcanized moulded products.

Percentages given in the following examples are percentages by weight and parts are parts by weight.

EXAMPLES

Comparison Example 1

A cascade of four high pressure stirrer autoclaves connected in series, each with a capacity of 5 liters, is continuously charged with 560 g/h of ethylene, a mixture (2000 ml/h) of one part of tert.-butanol and one part of vinyl acetate (d=0·79 g/m) and an initiator solution (120 ml/h) of 600 g of vinyl acetate, 600 g of tert.-butanol and 9 g of tert.-butyl perpivalate.

The stream of substance flows through all the autoclaves. The internal temperatures of the reactors are 64°, 68°, 73° and 80° C.

The operating pressure is adjusted to 300 bar.

When equilibrium has been established, samples are removed from the individual reactors through gates. Unused ethylene is carefully pressure released and discharged. The degasified samples contain from 15 to 48% of solid substance. The vinyl acetate content of the polymer is 70%. The Mooney viscosity of the raw material is 29 ML-4/100° C.

Example 1

The cascade from Comparison Example 1 is continuously charged with 200 g/h of ethylene, a mixture (2000 ml/h) of one part of vinyl acetate and one part of tert.-butanol and an initiator solution (120 ml/h) of 600 g of vinyl acetate, 600g of tert.-butanol and 9 g of tert.-butyl perpivalate.

This stream of substance flows through all the autoclaves. The internal temperatures of the reactors are 64°, 67°, 73° and 81° C.

The operating pressure at the end of the cascade is adjusted to 300 bar. The solids content in the first autoclave is from 5 to 35% before after-dosing of the ethylene.

360 g/h of ethylene are then after-dosed into the last but one autoclave. The solids content is 35 to 48%. An opaque, much less tacky polymer having a vinyl acetate content of 70% and a Mooney viscosity of 25 ML-4/100° c. is obtained.

Comparison Example 2

Comparison Example 1 is repeated except that the cascade of autoclaves is continuously charged with 700 g/h of ethylene, a mixture (2000 ml/h) of one part of tert.-butanol and one part of vinyl acetate, and an initiator solution (120 ml/h) of 360 g of vinyl acetate, 640 g of tert.-butanol and 9 g of Porofor N (azo-bis-isobutyronitrile). The internal temperatures of the reactors are 64°, 68°, 73° and 80° C. The solids content in the cascade of autoclaves is from 5 to 50%. The vinyl acetate content of the polymer is 52% and The Mooney viscosity is 28 ML-4/100° C.

Example 2

The cascade from Comparison Example 2 is continuously charged with 350 g/h of ethylene, a mixture (2000 ml/h) of one part of vinyl acetate and 1·77 parts of tert.-butanol and an initiator solution (120 ml/h) of 360 g of vinyl acetate, 640 g of tert.-butanol and 6·5 g of Porofor N.

This stream of substance flows through all the autoclaves. The internal temperatures of the reactors are 64°, 68°, 73° and 80° C. The operating pressure is then adjusted to 300 bar for all the autoclaves. The solids content in the first autoclave is 5 to 35% before the after-dosing with ethylene. 350 g/h of ethylene are then after-dosed into the last but one autoclave. The solids content in the last autoclave is 46%. An opaque, much less tacky copolymer having a VA content of 50% and a Mooney viscosity of 22 ML-4/100° C. is obtained.

Comparison Example 3

Comparison Example 1 is repeated except that the cascade of autoclaves is continuously charged with 200 g/h of ethylene, a mixture (2000 ml/h) of one part of tert.-butanol and one part of vinyl acetate, and an initiator solution (120 ml/h of 600 g of vinyl acetate, 600 g of tert.-butanol and 9 g of tert.-butyl perpivalate. The internal temperatures of the reactors are 64°, 68°, 73° and 80° C. The solids content is 47%. The vinyl acetate content of the polymer is 85% and the Mooney viscosity is 28 ML-4/100° C.

Example 3

Comparison Example 3 is repeated except that the cascade of autoclaves is continuously charged with 100 g/h of ethylene, a mixture (2000 ml/h) of tert.-butanol and one part of vinyl acetate, and an initiator solution (120 ml/h) of 600 g of vinyl acetate, 600 g of tert.-butanol and 9 g of tert.-butyl perpivalate. The internal temperatures of the reactors are 64°, 68°, 72° and 80° C. The operating pressure is then adjusted to 300 bar for all the autoclaves. The solids content in the first autoclave before ethylene is after-dosed amounts to 5 to 55%. 100 g/h of ethylene are then after-dosed in to the last but one autoclave. The solids content of the last autoclave is 48%. An opaque copolymer having a VA constant of 80% and a Mooney viscosity of 20 ML-4/100° C. is obtained.

We claim:

1. Process for the preparation of ehtylene/vinyl acetate copolymers having a copolymerized vinyl acetate content of from 40 to 98% by weight, based on the copolymer, by solution polymerisation of the ethylene and vinyl acetate in the presence of radical forming initiators at temperatures from 40° to 120° C. and a pressure of 50 to 700 bar, characterised in that
   a) vinyl acetate and ethylene in a molar ratio of 1:0·3 to 1:20 are first subjected to polymerisation and, when a conversion of from 10 to 70% has been reached, based on the vinyl acetate put into the process,
   b) ethylene is added to the reaction mixture in a quantity of from 10 to 200% by weight of the quantity of ethylene put into stage a) and polymerisation is then continued to a conversion of from 25 to 90%, based on the vinyl acetate introduced,
   the polymerisation of stage b) resulting in an increase in conversion of at least 5%, based on vinyl acetate and compared with the conversion in stage a).

2. Process according to claim 1 for the preparation of copolymers having a copolymerised vinyl acetate content of from 50 to 85% by weight, based on the copolymer.

3. Process according to claim 1, in which polymerisation is carried out at temperatures from 50° to 90° C.

4. Process according to claim 1, in which polymerisation is carried out under a pressure of 50 to 700 bar.

5. Process according to claim 1, in which ethylene and vinyl acetate are used in a molar ratio of from 1:1 to 1:2 in stage a).

6. Process according to claim 1, in which a further quantity of ethylene is added in stage 6 after a conversion of 35 to 60%, based on the vinyl acetate put into the process, has been reached.

7. Process according to claim 1, in which from 50 to 150% by weight of the quantity of ethylene used in stage a) is added in stage b).

8. Process according to claim 1, in which polymerisation is carried out to a conversion of from 35 to 80% in stage b), based on the quantity of vinyl acetate introduced.

9. Process according to claim 1 in which the polymerisation of stage b) results in an increase in conversion of at least 10%, based on the vinyl acetate and compared with the conversion in stage a).

* * * * *